United States Patent
Hamada

(10) Patent No.: US 10,728,938 B2
(45) Date of Patent: Jul. 28, 2020

(54) COMMUNICATION APPARATUS, METHOD OF CONTROLLING COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Masashi Hamada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/012,127

(22) Filed: Jun. 19, 2018

(65) Prior Publication Data

US 2018/0376527 A1    Dec. 27, 2018

(30) Foreign Application Priority Data

Jun. 27, 2017    (JP) .................... 2017-125589

(51) Int. Cl.
    *H04W 76/14* (2018.01)
    *H04W 84/18* (2009.01)
    (Continued)

(52) U.S. Cl.
    CPC ............ *H04W 76/14* (2018.02); *H04L 67/04* (2013.01); *H04L 67/14* (2013.01); *H04L 67/16* (2013.01);
    (Continued)

(58) Field of Classification Search
    CPC ..... H04W 76/14; H04W 84/18; H04W 84/20; H04W 92/02; H04W 48/16; H04W 8/005;
    (Continued)

(56) References Cited

U.S. PATENT DOCUMENTS 8,478,360 B2   7/2013   Soliman
9,407,713 B2   8/2016   Luna
(Continued)

FOREIGN PATENT DOCUMENTS

| EP | 2582182 A1 | 4/2013 |
|---|---|---|
| JP | 2006515492 A | 5/2006 |
| JP | 2013059075 A | 3/2013 |
| JP | 2013537754 A | 10/2013 |
| WO | 2005011298 A2 | 2/2005 |
| WO | 2012018556 A2 | 2/2012 |

OTHER PUBLICATIONS

Extended European Search Report issued in European Appln. No. 18176450.7 dated Nov. 6, 2018.
(Continued)

*Primary Examiner* — Eugene Yun
(74) *Attorney, Agent, or Firm* — Rossi, Kimms & McDowell LLP

(57) ABSTRACT

A communication apparatus capable of functioning as a central device and being connected to a first piconet and capable of functioning as a peripheral device and being connected to a second piconet using a communication method complying with a Bluetooth standard, receives, from a first device functioning as the peripheral device on the first piconet, information for identifying a service supported by the first device and data associated with the service, and transmits the information for identifying the service to a second device functioning as the central device on the second piconet.

12 Claims, 10 Drawing Sheets

(51) Int. Cl.
| | |
|---|---|
| H04L 29/08 | (2006.01) |
| H04W 92/02 | (2009.01) |
| H04W 4/80 | (2018.01) |
| H04W 8/00 | (2009.01) |
| H04W 48/16 | (2009.01) |
| H04W 84/20 | (2009.01) |
| H04W 88/16 | (2009.01) |
| H04W 88/18 | (2009.01) |

(52) U.S. Cl.
CPC ............. *H04W 4/80* (2018.02); *H04W 8/005* (2013.01); *H04W 48/16* (2013.01); *H04W 84/18* (2013.01); *H04W 84/20* (2013.01); *H04W 92/02* (2013.01); *H04W 88/16* (2013.01); *H04W 88/182* (2013.01)

(58) Field of Classification Search
CPC ..... H04W 4/80; H04W 88/16; H04W 88/182; H04L 67/04; H04L 67/16; H04L 67/14
USPC ....................................................... 455/41.2
See application file for complete search history.

(56) References Cited

U.S. PATENT DOCUMENTS

| | | | |
|---|---|---|---|
| 2003/0018708 A1* | 1/2003 | Hlasny | H04L 29/12113 709/203 |
| 2004/0190046 A1* | 9/2004 | Ilda | H04N 1/00209 358/1.15 |
| 2005/0009542 A1 | 1/2005 | Oprescu-Surcobe et al. | |
| 2005/0180343 A1 | 8/2005 | Van Valkenburg | |

OTHER PUBLICATIONS

Nordbotten et al. "Methods for service discovery in Bluetooth scatternets". Computer Communications. 2004: 1087-1096. vol. 27.

Oikonomou et al. "ADDER: Probabilistic, Application Layer Service Discovery for MANETs and Hybrid Wired-Wireless Networks". IEEE Computer Society. 2011 Ninth Annual Communication Networks and Services Research Conference. 2011: 33-40.

* cited by examiner

COMMUNICATION APPARATUS, METHOD OF CONTROLLING COMMUNICATION APPARATUS, AND NON-TRANSITORY COMPUTER-READABLE STORAGE MEDIUM

BACKGROUND OF THE INVENTION

Field of the Invention

The present invention relates to a communication apparatus, a method of controlling the communication apparatus, and a non-transitory computer-readable storage medium.

Description of the Related Art

In recent years, a radio sensor network system has been put to practical use, in which a communication apparatus collects a result measured by a sensing device existing in the neighborhood via communication by a short-range radio communication method and uses it as additional information of a service to be provided. In a system that uses Bluetooth® as one of short-range radio communication methods, when devices enjoy a radio sensor network service, a pairing operation needs to be executed for each combination of devices that enjoy the service.

In addition, the system using Bluetooth can use a "scatter network function" that allows a communication apparatus to hold a piconet (network) already formed with a sensing device and also newly participate in a piconet formed by an information processing apparatus in the neighborhood. For example, consider an example in which a user who carries a mobile communication apparatus (for example, a smartphone) that is forming a piconet with a sensing device such as a pulse rate meter rides in a vehicle in which an in-vehicle information processing apparatus that is providing a Bluetooth audio service is mounted. In this case, the mobile communication apparatus can execute reproduction of music data stored in the mobile communication apparatus in the in-vehicle information processing apparatus by using the scatter network function.

On the other hand, according to the evolution of an emergency notification system or the like on the occurrence of an accident, the in-vehicle information processing apparatus is required to automatically collect vital information measured by the sensing device held by the user. Although the standards of Bluetooth associated with the scatter network include a standard for the topology of communication connection, there is no standard for bridge/routing and the like of data. Hence, the in-vehicle information processing apparatus cannot acquire measurement information of the sensing device only by forming the scatter network by the mobile communication apparatus.

To solve this problem, Japanese Patent Laid-Open No. 2013-59075 discloses a system in which a specific information communication apparatus makes a proxy response concerning control information in the system and executes control of setting of a payload data communication radio link between an information providing apparatus and an information receiving apparatus. In addition, Japanese Patent Laid-Open No. 2006-515492 discloses a system in which a communication apparatus at the estimated existence position of a radio communication apparatus makes a proxy response to an in-zone confirmation message of a radio system. On the other hand, focusing on the updating period of information, Japanese Patent Laid-Open No. 2013-537754 discloses a method of providing a relay server between an information providing apparatus and an information receiving apparatus and updating information in accordance with the frequency of access to the relay server.

In the above-described conventional technique, the in-vehicle information communication apparatus cannot acquire sensing information via the mobile communication apparatus only by forming the scatter network with the mobile communication apparatus that is operating as a master communication apparatus of a piconet for controlling a sensing device group. In addition, when temporarily using the service, a pairing operation between the in-vehicle information communication apparatus and each sensing device is necessary, and this operation is a burden on the user.

SUMMARY OF THE INVENTION

The present invention provides a technique of efficiently performing communication to use a service in consideration of the above-described problem.

According to one aspect of the present invention, there is provided a communication apparatus capable of functioning as a central device and being connected to a first piconet and capable of functioning as a peripheral device and being connected to a second piconet using a communication method complying with a Bluetooth standard, the apparatus comprising: a first communication unit configured to receive, from a first device functioning as the peripheral device on the first piconet, information for identifying a service supported by the first device and data associated with the service; and a second communication unit configured to transmit the information for identifying the service to a second device functioning as the central device on the second piconet.

Further features of the present invention will become apparent from the following description of exemplary embodiments (with reference to the attached drawings).

DESCRIPTION OF THE EMBODIMENTS

The present invention will now be described in detail with reference to the accompanying drawings based on an example of the embodiment. Note that an arrangement shown in the following embodiment is merely an example, and the present invention is not limited to the illustrated arrangement.

Figure 1:
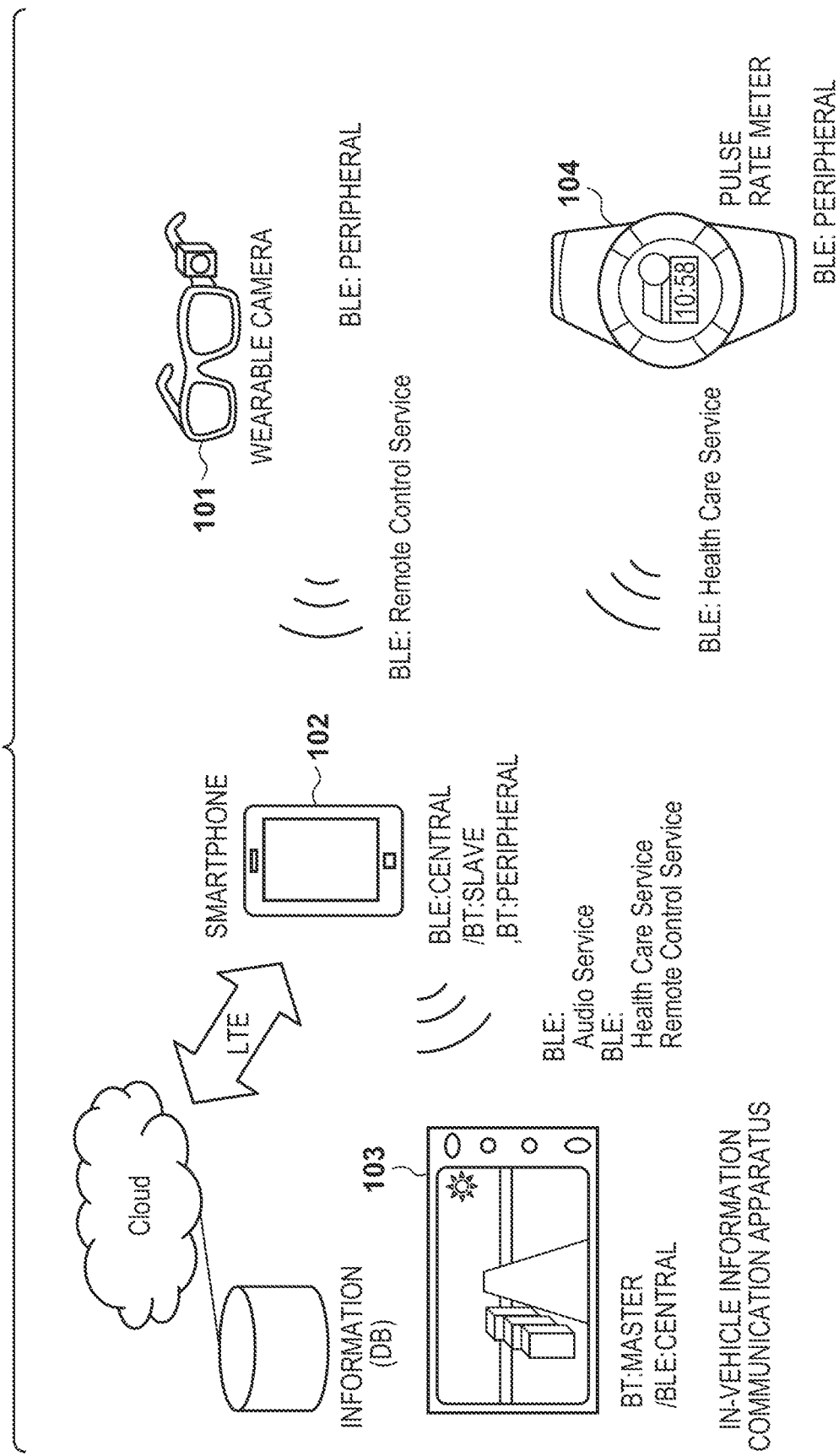
FIG. 1 is a schematic view of a sensing information collection system according to an embodiment.

FIG. 1 is a schematic view of a system (to be referred to as a sensing information collection system hereinafter) according to this embodiment, in which a result measured by a sensing device is collected via communication by a short-range radio communication method. This system is formed by a wearable camera 101 and a pulse rate meter 104 which serve as sensing devices, and a smartphone 102 and an in-vehicle information communication apparatus (IVI (In-Vehicle Infotainment)) 103 which serve as mobile communication apparatuses. The wearable camera 101 and the pulse rate meter 104 are worn or held by, for example, the driver of a vehicle in which the in-vehicle information communication apparatus 103 is mounted. Each of the wearable camera 101, the smartphone 102, the in-vehicle information communication apparatus 103, and the pulse rate meter 104 includes a radio communication interface based on the Bluetooth standard that is an example of short-range radio communication standards. Note that the devices are examples and are not limited to the devices shown in FIG. 1 as long as each device is a device including a radio communication interface based on the Bluetooth standard.

Figure 6:
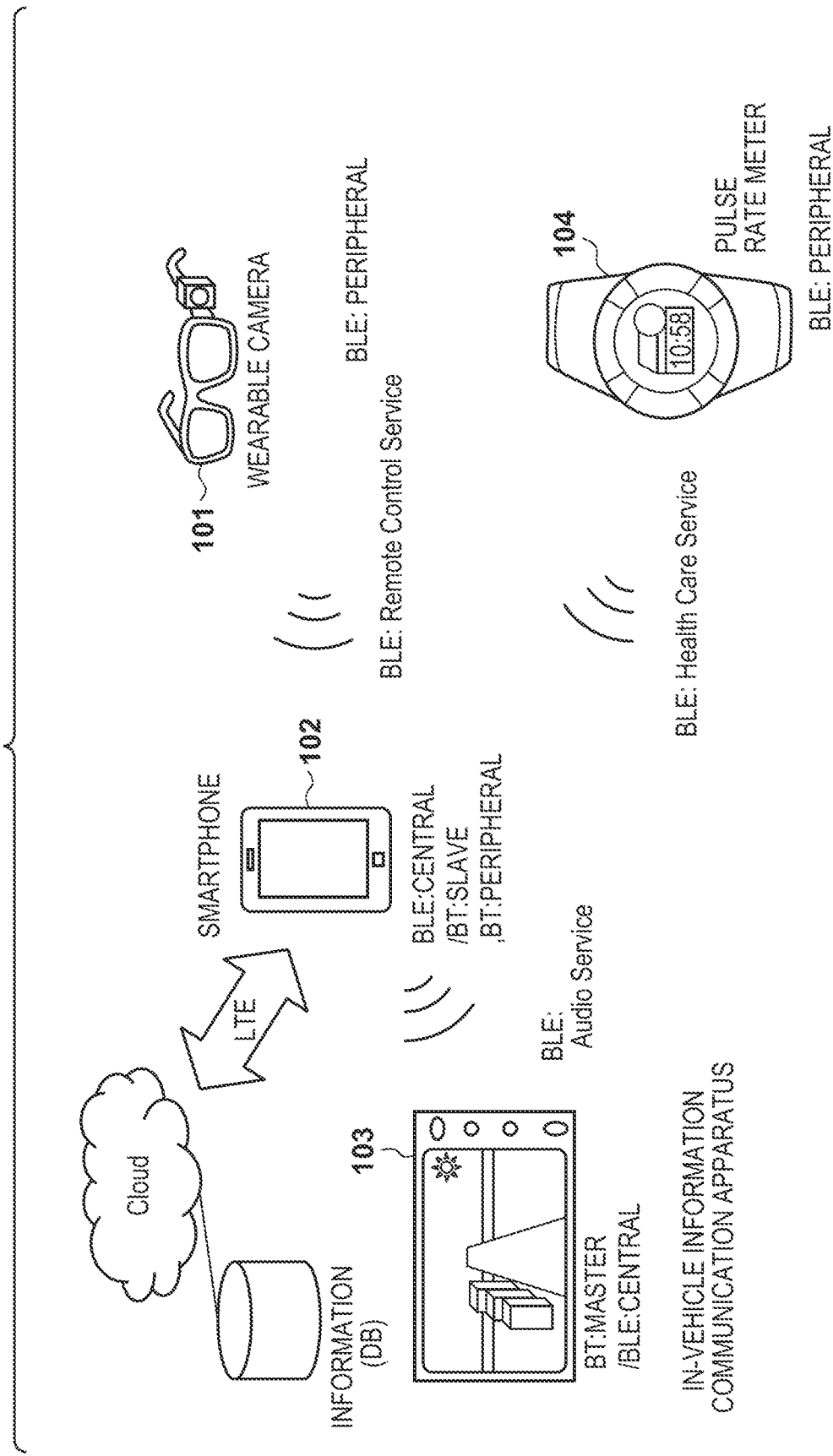
FIG. 6 is a schematic view of a conventional sensing information collection system.

In the description of this embodiment, the smartphone 102 serving as a central device of BLE (Bluetooth Low Energy) connection forms a piconet with a sensing device (the wearable camera 101 and/or the pulse rate meter 104). The BLE connection is done via a Bluetooth communication path. The piconet will be referred to as a lower piconet. Here, the wearable camera 101 and the pulse rate meter 104 function as peripheral devices of BLE connection. In this state, the smartphone 102 participates as a peripheral device in a piconet formed by the in-vehicle information communication apparatus 103 that is a central device of new BLE connection, thereby forming a scatter network. The piconet formed by the in-vehicle information communication apparatus 103 will be referred to as an upper piconet. FIG. 6 is a schematic view of a conventional sensing information collection system. Conventionally, as shown in FIG. 6, the smartphone 102 can collect a measurement data value from a sensing device in the lower piconet. However, to allow the in-vehicle information communication apparatus 103 to collect the measurement data value from the sensing device, a pairing operation between the sensing device and the in-vehicle information communication apparatus 103 needs to be performed by the user. On the other hand, in this embodiment, the smartphone 102 can transmit the measurement data value collected from the sensing device to the in-vehicle information communication apparatus 103 by proxy for the sensing device by performing processing to be described later.

Figure 2:
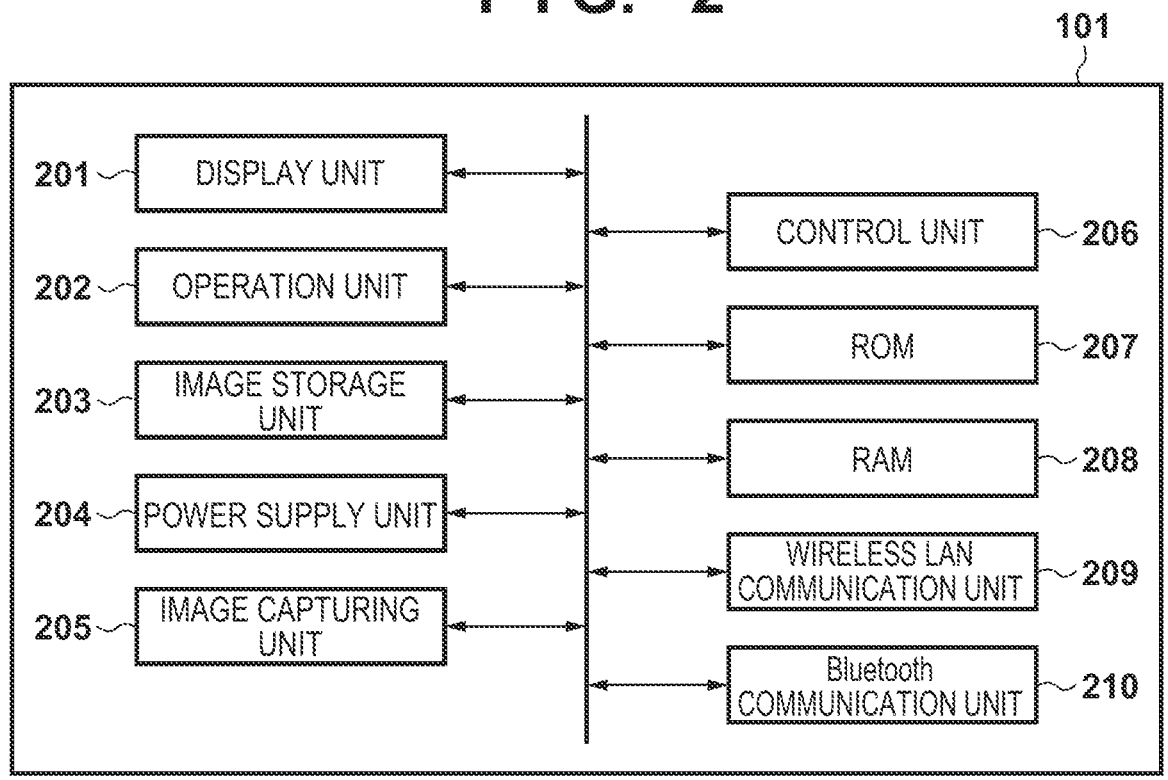
FIG. 2 is a block diagram showing an example of the hardware arrangement of a wearable camera.

The hardware arrangements of the wearable camera 101, the smartphone 102, the in-vehicle information communication apparatus 103, and the pulse rate meter 104 will be described next with reference to FIGS. 2 to 5. The wearable camera 101 will be described first. FIG. 2 is a block diagram for explaining the hardware arrangement of the wearable camera 101. The wearable camera 101 includes a display unit 201, an operation unit 202, an image storage unit 203, a power supply unit 204, an image capturing unit 205, a control unit 206, a ROM 207, a RAM 208, a wireless LAN communication unit 209, and a Bluetooth communication unit 210. Note that ROM stands for Read Only Memory, and RAM stands for Random Access Memory.

The display unit 201 is formed by, for example, an LCD (Liquid Crystal Display) or the like, has a function of outputting information that can visually be recognized, and performs display such as display of a UI (User Interface), an alarm, and an image. The operation unit 202 has a function of performing various kinds of inputs and the like and operating the device. The image storage unit 203 is formed by, for example, a nonvolatile memory medium such as an SD card and stores image data. The power supply unit 204 holds a power supply (a battery or the like) used to operate the entire device and supplies power to each hardware.

The image capturing unit 205 is formed by, for example, an image capturing engine mainly including a lens and an image sensor, and generates image data by encoding a captured image. The control unit 206 is formed by, for example, one or a plurality of CPUs (Central Processing Units), and controls the operation of the entire wearable camera 101. The ROM 207 stores control instructions, that is, programs. Various kinds of operations of the wearable camera 101 to be described later are implemented when the control unit 206 executes a control program stored in the ROM 207. The RAM 208 is used as a work memory when executing a program or to temporarily save data. The wireless LAN communication unit 209 performs communication (Wi-Fi® or the like) complying with the IEEE802.11 series, and is used for high-speed transfer of payload data such as image data. The Bluetooth communication unit 210 performs Bluetooth communication that is power-saving radio communication.

Figure 3:
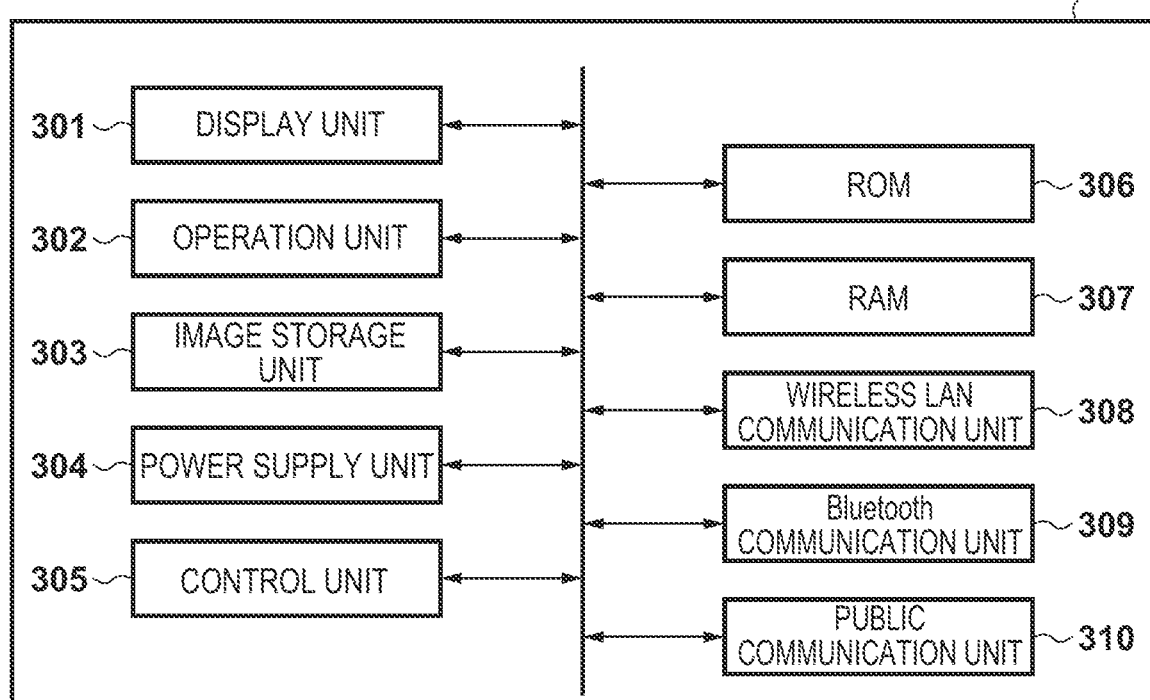
FIG. 3 is a block diagram showing an example of the hardware arrangement of a smartphone 102.

The smartphone 102 will be described next. FIG. 3 is a block diagram for explaining the hardware arrangement of the smartphone 102. The smartphone 102 includes a display unit 301, an operation unit 302, an image storage unit 303, a power supply unit 304, a control unit 305, a ROM 306, a RAM 307, a wireless LAN communication unit 308, a Bluetooth communication unit 309, and a public communication unit 310.

The display unit 301 is formed by, for example, an LCD or an LED (Light Emitting Diode), has a function of outputting information that can visually be recognized, and performs display of a UI, an alarm, and the like. The operation unit 302 has a function of performing various kinds of inputs and the like and operating the device. The image storage unit 303 stores image data. The power supply unit 304 holds a power supply (a battery or the like) used to operate the entire device and supplies power to each hardware. The control unit 305 is formed by one or a plurality of CPUs, and controls the operation of the entire smartphone 102. The ROM 306 stores control instructions, that is, programs. Various kinds of operations of the smartphone 102 to be described later are implemented when the control unit 305 executes a control program stored in the ROM 306. The RAM 307 is used as a work memory when executing a program or to temporarily save data.

The wireless LAN communication unit 308 performs communication (Wi-Fi or the like) complying with the IEEE802.11 series. The Bluetooth communication unit 309 performs Bluetooth communication that is power-saving radio communication. In this embodiment, the Bluetooth communication unit 309 communicates with the sensing devices (the wearable camera 101 and the pulse rate meter 104) in the neighborhood and the in-vehicle information communication apparatus 103. The public communication unit 310 performs public radio communication such as 3GPP (3rd Generation Partnership Project) and LTE (Long Term Evolution).

Figure 4:
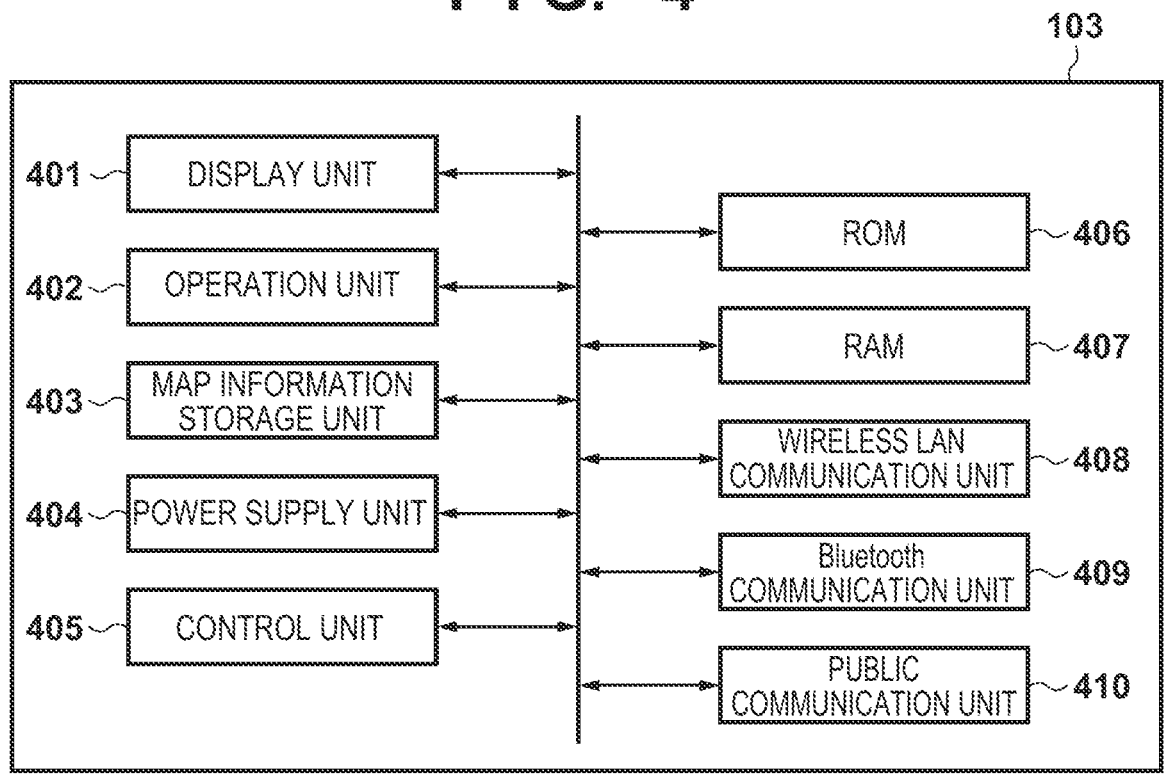
FIG. 4 is a block diagram showing an example of the hardware arrangement of an in-vehicle information communication apparatus (IVI) 103.

The in-vehicle information communication apparatus (IVI) 103 will be described next. FIG. 4 is a block diagram for explaining the hardware arrangement of the in-vehicle information communication apparatus. The in-vehicle information communication apparatus (IVI) 103 includes a display unit 401, an operation unit 402, a map information storage unit 403, a power supply unit 404, a control unit 405, a ROM 406, a RAM 407, a wireless LAN communication unit 408, a Bluetooth communication unit 409, and a public communication unit 410.

The display unit 401 is formed by, for example, an LCD or an LED, has a function of outputting information that can visually be recognized, and performs display of a UI, an alarm, and the like. The operation unit 402 has a function of performing various kinds of inputs and the like and operating the device. The map information storage unit 403 is formed by, for example, a nonvolatile memory medium such as an SD card and stores map information and the like. The power supply unit 404 converts the power supply voltage of an onboard battery into a power supply voltage used to operate the entire device and supplies power to each hardware. The control unit 405 is formed by one or a plurality of CPUs, and controls the operation of the entire in-vehicle information communication apparatus (IVI) 103. The ROM 406 stores control instructions, that is, programs. Various kinds of operations of the in-vehicle information communication apparatus (IVI) 103 to be described later are implemented when the control unit 405 executes a control program stored in the ROM 406. The RAM 407 is used as a work memory when executing a program or to temporarily save data.

The wireless LAN communication unit 408 performs communication (Wi-Fi or the like) complying with the IEEE802.11 series. The Bluetooth communication unit 409 performs Bluetooth communication that is power-saving radio communication. In this embodiment, the Bluetooth communication unit 409 communicates with the smartphone 102 in the neighborhood. The public communication unit 410 performs public radio communication such as 3GPP and LTE.

Figure 5:
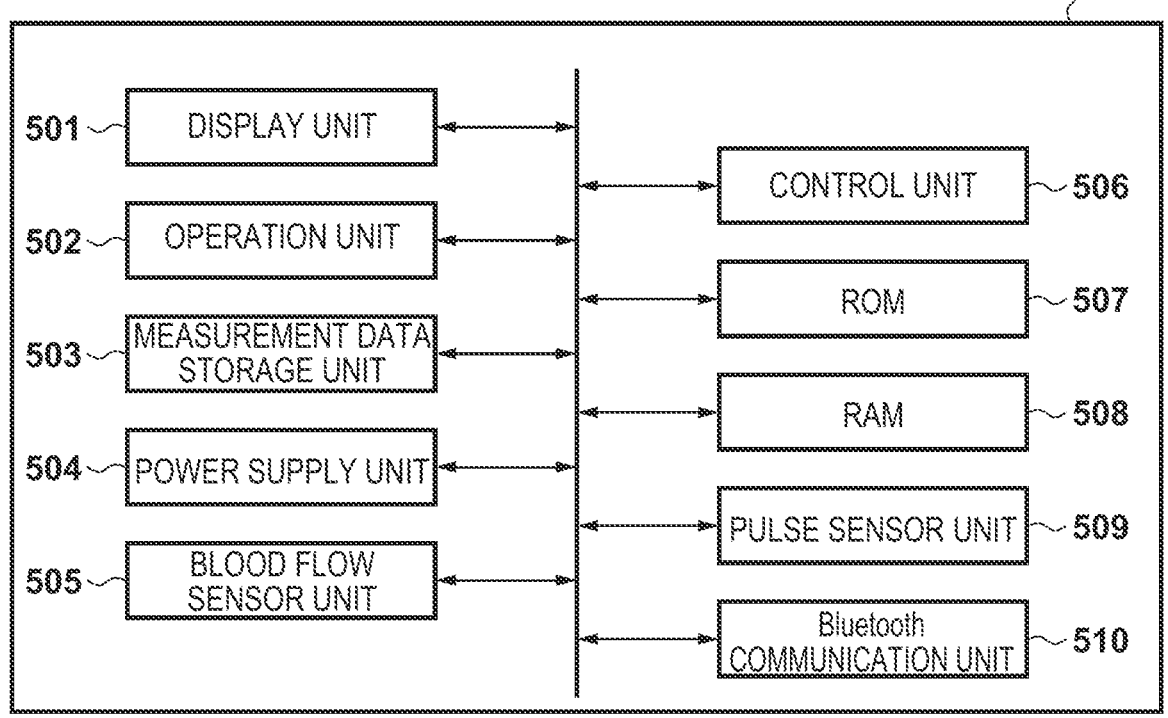
FIG. 5 is a block diagram showing an example of the hardware arrangement of a pulse rate meter 104.

The pulse rate meter 104 will be described next. FIG. 5 is a block diagram for explaining the hardware arrangement of the wearable pulse rate meter 104. The pulse rate meter 104 includes a display unit 501, an operation unit 502, a measurement data storage unit 503, a power supply unit 504, a blood flow sensor unit 505, a control unit 506, a ROM 507, a RAM 508, a pulse sensor unit 509, and a Bluetooth communication unit 510.

The display unit 501 is formed by, for example, an LCD or the like, has a function of outputting information that can visually be recognized, and performs display such as display of a UI, an alarm, and an image. The operation unit 502 has a function of performing various kinds of inputs and the like and operating the device. The measurement data storage unit 503 is formed by, for example, a nonvolatile memory medium such as an internal EEPROM (Electrically Erasable Programmable ROM) and stores a measurement data history and the like. The power supply unit 504 holds a power supply (a battery or the like) used to operate the entire device and supplies power to each hardware.

The blood flow sensor unit 505 is formed by a sensor using, for example, a photoelectric element, and measures the blood flow in a blood vessel near the wearing portion. The control unit 506 is formed by one or a plurality of CPUs, and controls the operation of the entire pulse rate meter 104. The ROM 507 stores control instructions, that is, programs. Various kinds of operations of the pulse rate meter 104 to be described later are implemented when the control unit 506 executes a control program stored in the ROM 507. The RAM 508 is used as a work memory when executing a program or to temporarily save data. The pulse sensor unit 509 is formed by a sensor using a piezoelectric element, and measures the pulsation of a blood vessel near the wearing portion. The Bluetooth communication unit 510 performs Bluetooth communication that is power-saving radio communication.

Figure 11:
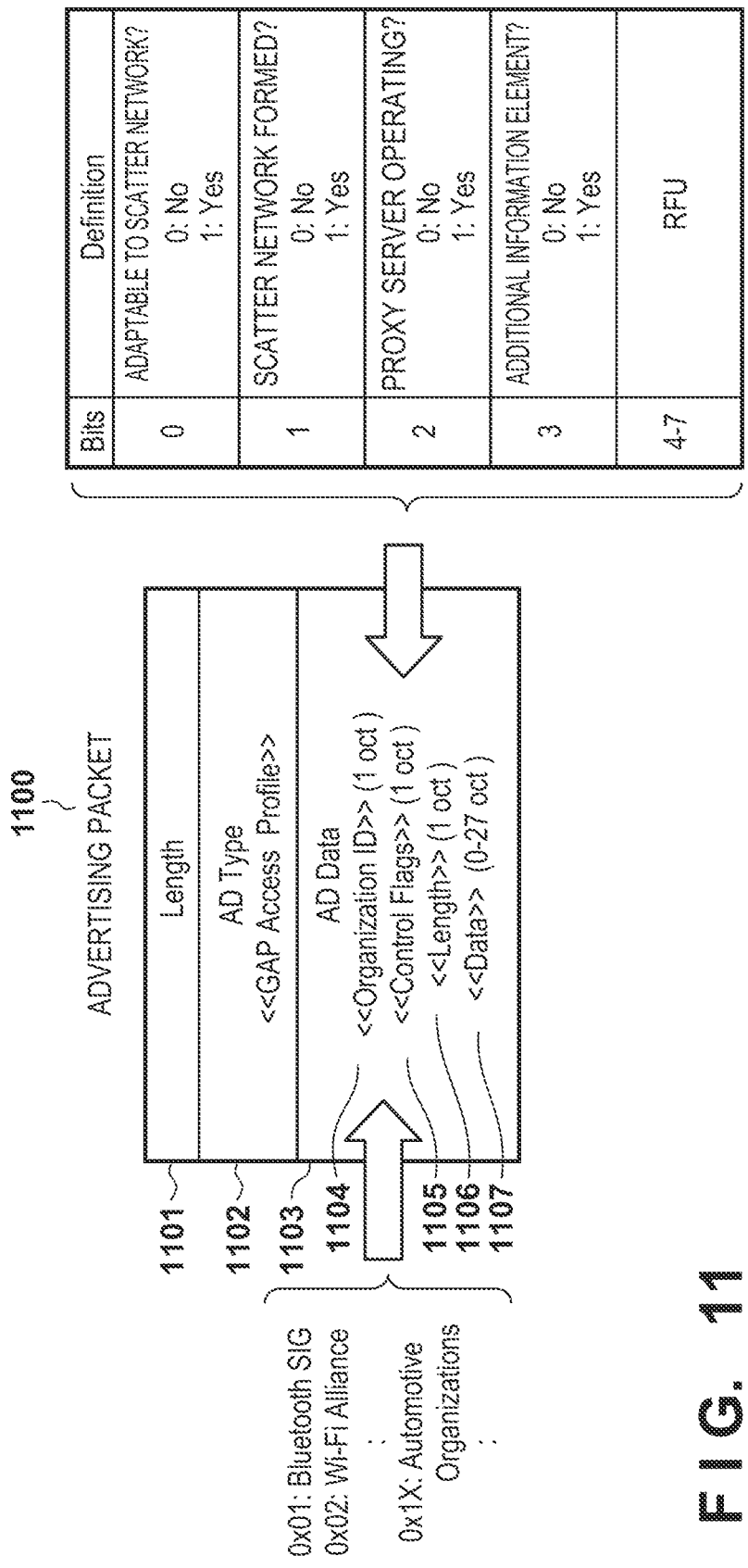
FIG. 11 is a view showing an example of the data structure of an advertising packet.

An advertising packet that the smartphone 102 transmits to notify its capability will be described next. FIG. 11 shows an example of the data structure of an advertising packet 1100 transmitted by the smartphone 102. The advertising packet 1100 is formed by a Length field 1101, an AD (Advertising Data) Type field 1102, and an AD Data field 1103. The Length field 1101 is a field configured to notify the effective data length of the packet. The AD Type field is a field configured to designate the type of information notified using the advertising packet 1100. The AD Data field is a field configured to store notification target data.

In this embodiment, assume that the advertising packet 1100 is used to notify the in-vehicle information communication apparatus 103 of a service supported by the smartphone 102. Hence, as an example, a value representing "GAP (Generic Access Profile) Access Profile" s set in the AD Type field 1102. Additionally, in an "Organization ID" field 1104 in the AD Data field 1103, a value representing "Automotive Organization" that defines subsequent information elements (1105, 1106, and 1107) in the field is stored.

Processing performed when a driver (to be referred to as a user hereinafter) who holds the smartphone 102 and wears the wearable camera 101, and the pulse rate meter 104 rides in a vehicle in which the in-vehicle information communication apparatus 103 is mounted will be described next with reference to FIGS. 7 to 12.

Figure 7:
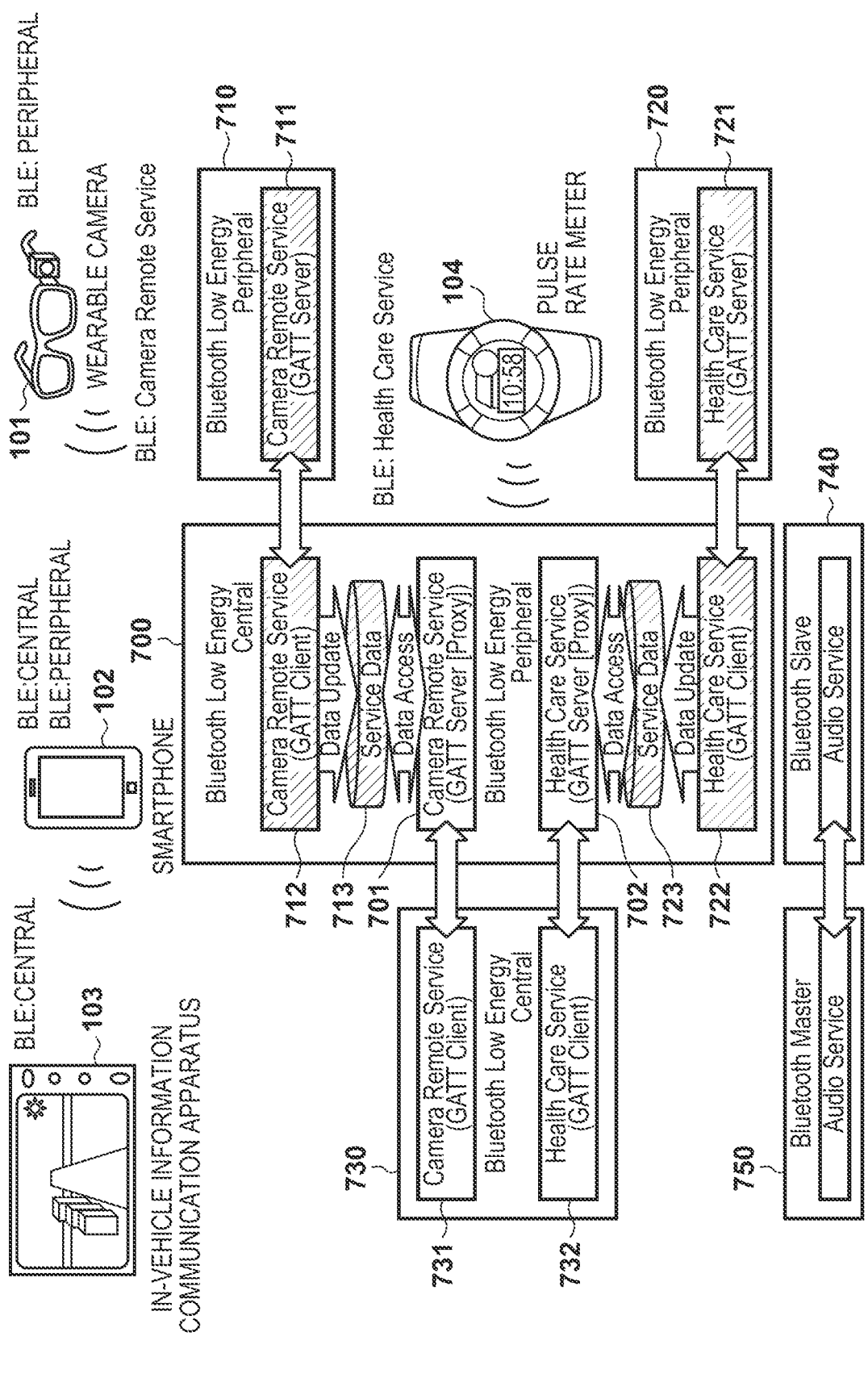
FIG. 7 is a schematic view showing the data flow of the sensing information collection system according to the embodiment.

FIG. 7 is a schematic view showing the data flow of the sensing information collection system according to this embodiment. The smartphone 102 serving as a mobile communication apparatus is connected to the wearable camera 101 serving as a sensing device via a Bluetooth communication path. The smartphone 102 provides a camera remote control service (Camera Remote Services 711 and 712). In addition, the smartphone 102 is connected to the pulse rate meter 104 serving as a sensing device via a Bluetooth communication path, and provides a health care information logging service (to be referred to as a health care service hereinafter) (Health Care Services 721 and 722). Here, the in-vehicle information communication apparatus 103 is assumed to need a health care service to collect vital information from the pulse rate meter 104 worn by the user. At the same time, the in-vehicle information communication apparatus 103 is assumed to need a camera remote control service to protect overwrite of image capturing information of the wearable camera of the user at the time of the occurrence of an emergency situation.

Here, the smartphone 102 is assumed to operate as a central device (Bluetooth Low Energy Central 700) on the Bluetooth communication path. In addition, the wearable camera 101 and the pulse rate meter 104 are assumed to operate as peripheral devices (Bluetooth Low Energy Peripherals 710 and 720). Hence, piconets using Bluetooth communication media are formed between the smartphone 102 and the wearable camera 101 and between the smartphone 102 and the pulse rate meter 104. The smartphone 102 can receive service data 713 and 723 from the wearable camera 101 and the pulse rate meter 104, respectively, using the piconets. Additionally, in the smartphone 102, proxy servers (GATT Server [Proxy]) 701 and 702 that redisclose the service data 713 and 723 received from the wearable camera 101 and the pulse rate meter 104 operate.

In addition, the smartphone 102 operates as a peripheral device on the Bluetooth communication path. Accordingly, a piconet can also be formed between the smartphone 102 and the in-vehicle information communication apparatus 103 operating as a central device (Bluetooth Low Energy Central 730). That is, a scatter network is formed at this time. When the scatter network is formed, the smartphone 102 can disclose service data collected from the wearable camera 101 and the pulse rate meter 104 to the new central device (in-vehicle information communication apparatus 103) by the proxy servers 701 and 702.

In this way, in this embodiment, the smartphone 102 forms the scatter network and causes the proxy servers 701 and 702 to operate. This makes it possible to provide (redisclose) service data by the camera remote control service and provide (redisclose) service data by the health care service.

Note that on the Bluetooth communication path, the smartphone 102 can operate as a slave communication apparatus (Bluetooth Slave 740). Hence, the smartphone 102 may provide, for example, a music information distribution service (Audio Service) to the in-vehicle information communication apparatus 103 operating as a master communication apparatus (Bluetooth Master 750).

Figure 8:
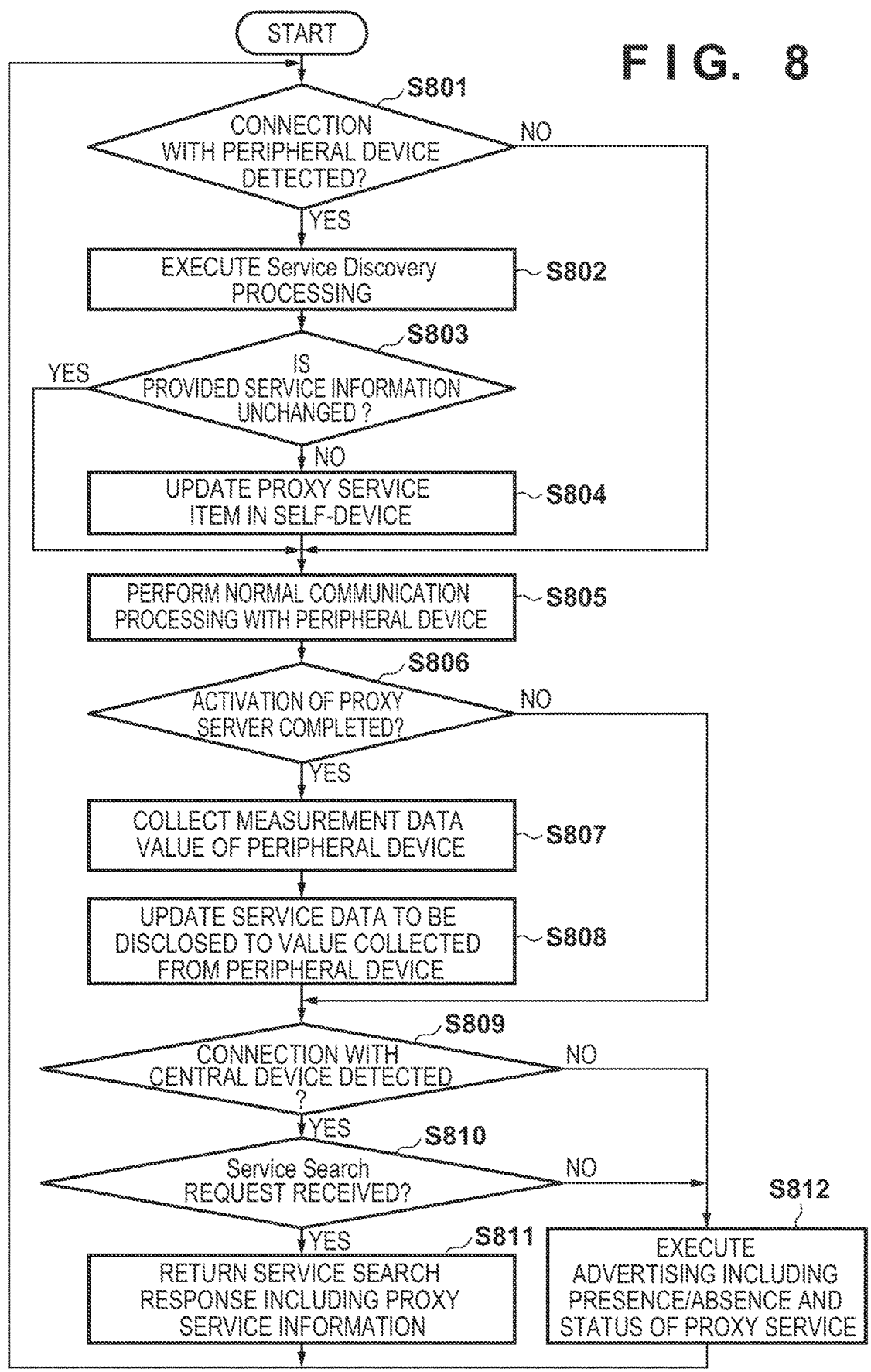
FIG. 8 is a flowchart of processing of the smartphone 102.

The operation of the smartphone 102 will be described next with reference to FIGS. 7 and 8. FIG. 8 is a flowchart of processing of collecting sensing information and transmitting it to the in-vehicle information communication apparatus (IVI) 103 by the smartphone 102. The CPU of the control unit 305 of the smartphone 102 executes a program stored in the ROM 306, thereby executing the steps shown in FIG. 8. First, the smartphone 102 determines whether BLE connection with the pulse rate meter 104 operating as a peripheral device (Bluetooth Low Energy Peripheral 720) via a Bluetooth communication path is detected (step S801). If BLE connection is detected (YES in step S801), the smartphone 102 executes service search processing (Service Discovery) in accordance with SDP (Service Discovery Protocol) (step S802). By the service search processing, the smartphone 102 recognizes that the newly connected pulse rate meter 104 is supporting and operating a Health Care Service. In addition, the smartphone 102 determines that the Health Care Service is a new service (provided service information is changed) for the smartphone 102 (NO in step S803).

Next, the smartphone 102 updates a proxy service item in the smartphone 102 (step S804). Then, the smartphone 102 activates the proxy server 702 of the Health Care Service such that the information of the Health Care Service that is a recognized service operating in the pulse rate meter 104 can be disclosed by proxy. Next, the smartphone 102 starts normal communication processing with the pulse rate meter 104 (step S805). After completion of activation of the proxy server 702 (YES in step S806), the smartphone 102 acquires a measurement data value from the pulse rate meter 104 (step S807). In step S806, the measurement data value may be acquired from the pulse rate meter 104 at a timing determined as a data updating timing by the proxy server 702 (step S807). In step S808, the proxy server 702 updates the service data 723 to be disclosed to the acquired data value (step S808). The service data 723 to be disclosed is thus equalized with the value disclosed by the pulse rate meter 104. Note that the advertising packet 1100 to be transmitted by the smartphone 102 for a support service notification after the activation of the proxy server 702 in step S806 is set as follows as an example. That is, the "Control Flags" field 1105 in the AD Data field 1103 is set to "adaptable to scatter network", "Proxy Server operating", and "additional information element exists" (see FIG. 11).

Next, the smartphone 102 detects connection with the in-vehicle information communication apparatus 103 operating as a central device (Bluetooth Low Energy Central 730) (YES in step S809). Next, the smartphone 102 determines the presence/absence of reception of a Service Search request (step S810). Upon receiving a Service Search request (YES in step S810), the smartphone 102 transmits a response to the Service Search request (step S811). In addition, independently of the reception of the Service Search request (NO in step S810), the smartphone 102 transmits the advertising packet at every predetermined reception timing (every advertising packet timing for a periodical support service notification) (step S812). The response and the advertising packet transmitted in steps S811 and S812 can include information (for example, UUID (Universally Unique Identifier)) to identify a service (here, the Health Care Service). In addition, the advertising packet transmitted in step S812 can also include information representing the presence/absence of a proxy service and the status of the service.

Figure 9:
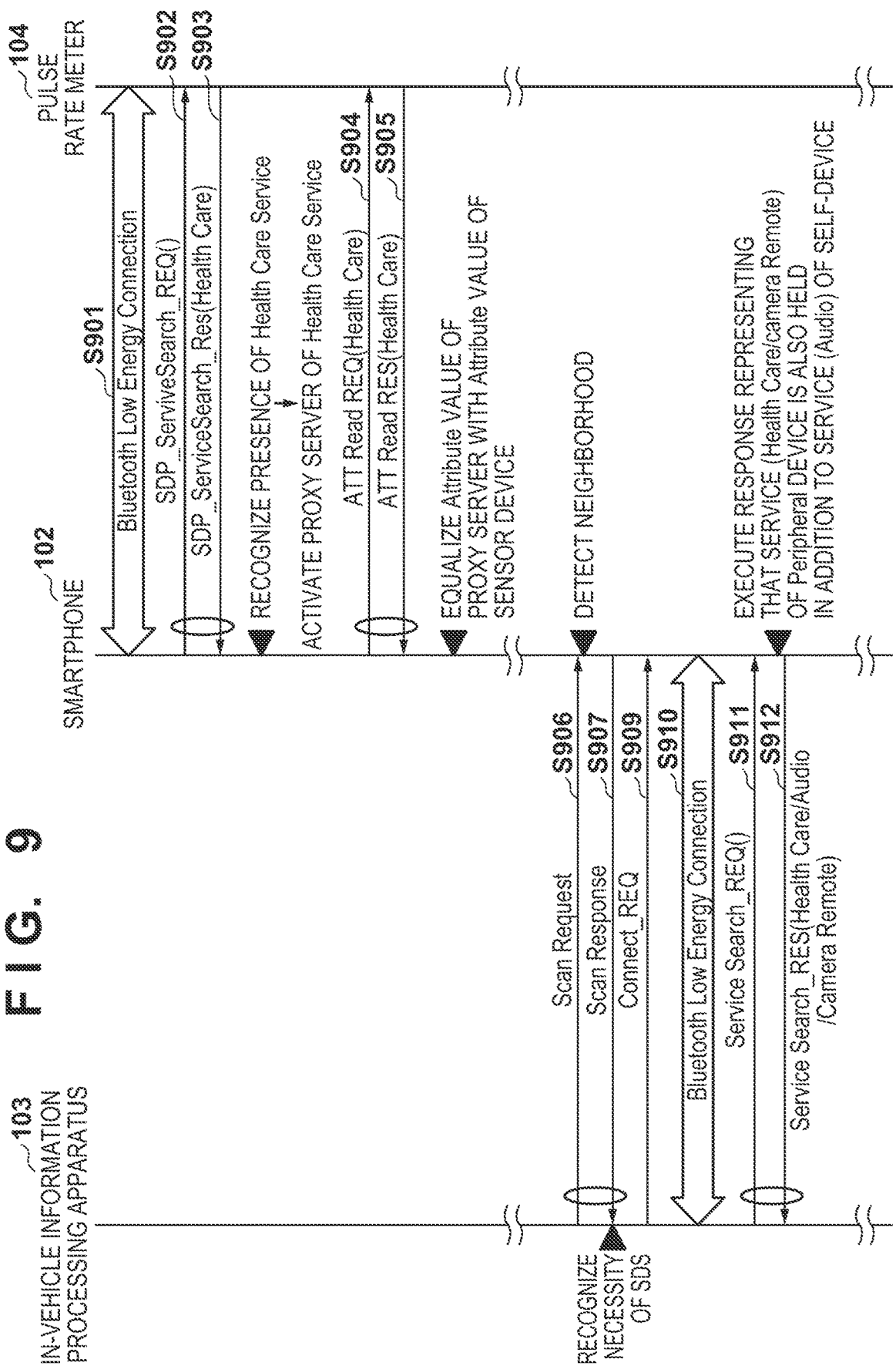
FIG. 9 is a schematic view (1) showing the operation procedure of the sensing information collection system according to the embodiment.
Figure 10:
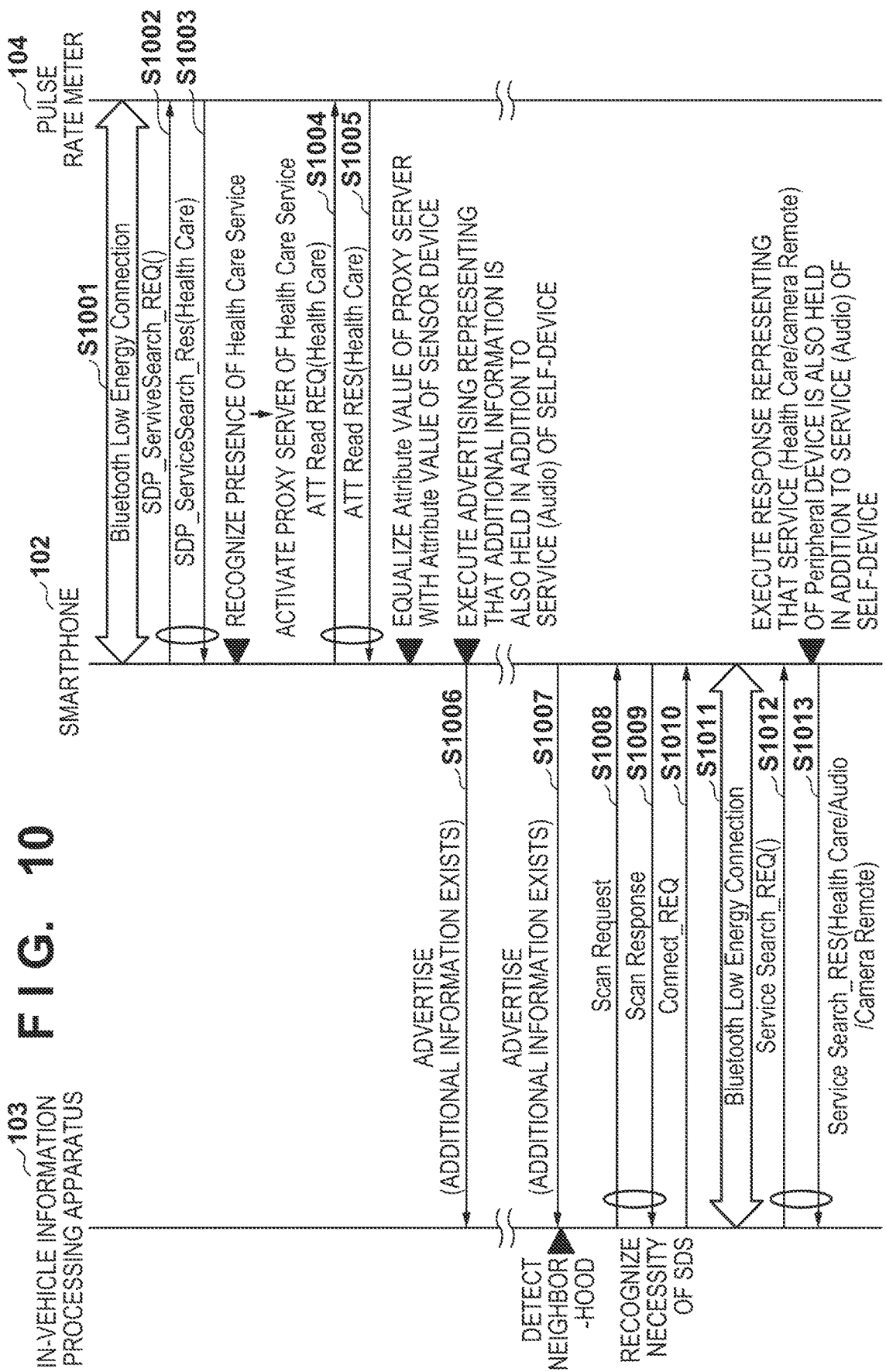
FIG. 10 is a schematic view (2) showing the operation procedure of the sensing information collection system according to the embodiment.

The operation of each device in the sensing information collection system according to this embodiment will be described next with reference to FIGS. 9 and 10 in association with FIG. 8. FIGS. 9 and 10 are views showing the operation sequence between the in-vehicle information communication apparatus 103, the smartphone 102, and the pulse rate meter 104. FIG. 9 shows a case in which the smartphone 102 detects the presence of the in-vehicle information communication apparatus 103, and FIG. 10 shows a case in which the in-vehicle information communication apparatus 103 detects the presence of the smartphone 102.

First, upon detecting connection with the pulse rate meter 104, the smartphone 102 starts BLE connection with the pulse rate meter 104 (YES in step S801, and steps S901 and S1001). After that, the smartphone 102 transmits a service request signal (SDP_ServiceSearch REQ( )) in accordance with SDP, thereby executing service search processing (steps S802, S902, and S1002). According to reception of the service request signal, the pulse rate meter 104 transmits a service response signal (SDP_ServiceSearch RES(Health Care)) representing that the pulse rate meter 104 supports a Health Care Service (steps S903 and S1003). Upon receiving the service response signal from the pulse rate meter 104, the smartphone 102 recognizes the presence of the Health Care Service (step S804), and activates the Proxy Server of the Health Care Service (YES in step S806). Next, the smartphone 102 transmits a measurement data request signal (ATT Read REQ(HealthCare)) to acquire a measurement data value from the pulse rate meter 104 (steps S904 and S1004). According to reception of the measurement data request signal, the pulse rate meter 104 transmits an assumed data response signal (ATT Read RES(HealthCare)) including the measurement data value (steps S905 and S1005). Upon receiving the measurement data value from the pulse rate meter 104 (step S807), the smartphone 102 equalizes service data to be disclosed with the measurement data value received from the pulse rate meter 104. More specifically, the smartphone 102 equalizes the Attribute value of the proxy server 702 with the Attribute value of the pulse rate meter 104.

After that, in the example shown in FIG. 10, the smartphone 102 transmits an advertising signal including additional information (for example, representing that a proxy service (here, the Health Care Service) exists) (NO in step S809, and steps S812, S1006, and S1007). The in-vehicle information communication apparatus 103 receives the advertising signal, thereby detecting that the smartphone 102 exists in the neighborhood. On the other hand, in FIG. 9, the smartphone 102 does not transmit the advertising signal, and the in-vehicle information communication apparatus 103 transmits a scan request message (Scan Request) (steps S906 and S1008). The scan request message is transmitted from the in-vehicle information communication apparatus 103 by Bluetooth communication when, for example, the user rides in (approaches) the vehicle in which the in-vehicle information communication apparatus 103 is mounted. Accordingly, the smartphone 102 detects that the in-vehicle information communication apparatus 103 exists in the neighborhood.

Upon receiving the scan request message (steps S906 and S1008), the smartphone 102 returns a scan response (Scan Response) to the in-vehicle information communication apparatus 103 (steps S907 and S1009). The smartphone 102 transmits a connection request signal (Connect REQ), thereby shifting to a scatter network operation of Bluetooth communication with the in-vehicle information communication apparatus 103 (steps S909, S910, S1010, and S1011).

After the shift to the scatter network, the smartphone 102 receives a Service Search request message from the in-vehicle information communication apparatus 103 via the Bluetooth communication path (YES in step S810, and steps S911 and S1012). The smartphone 102 then transmits a response message to the Service Search request message (steps S811, S912, and S1013). The message represents that the health care services 721 and 722 provided by the pulse rate meter 104 connected to the piconet to which the smartphone 102 itself is connected as a central device are being disclosed by proxy. Here, for example, a response message including information to identify the health care service is returned.

Figure 12:
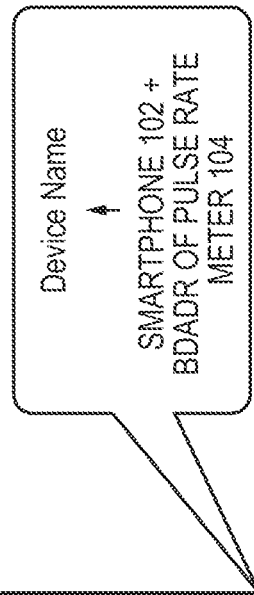
FIG. 12 is a view showing an example of the data structure of Bluetooth GATT profile data.

FIG. 12 shows an example of the structure of Bluetooth GATT profile data representing that the proxy service of redisclosure of the health care service is supported. FIG. 12 shows an example in which the physical address (BD Address) of the pulse rate meter 104 is registered in a "Device Name" information area 1204, which is for storing a nickname of a device that provides the proxy service, together with the nickname of the smartphone 102.

Note that the smartphone 102 may also return information for identifying a service (in this embodiment, Audio [music distribution]) provided/disclosed by the self-device using the response message (step S912 and S1013) (step S811).

As described above, according to this embodiment, the mobile communication apparatus is connected to the in-vehicle information communication apparatus or the like that is the central device on the upper piconet via the scatter network. This allows the in-vehicle information communication apparatus to enjoy the service provided by the sensing device of the lower piconet.

Modification

In the above-described embodiment, an example in which provided service information is transmitted/received using an SDS (Service Discovery Service) executed after setting of the Bluetooth communication path has been described. Here, if the data length of the Profile data structure that is needed to be transmitted/received is equal to or less than the size (1107) of the data information area of an SDP1 packet, the SDP executed after setting of the Bluetooth communication path may be used. Even when the provided service information is transmitted/received using the SDP, the same effect as described above can be obtained.

According to this embodiment, when the mobile apparatus (smartphone 102) operating as a central device on the piconet forms the scatter network, the sensing information of the sensing device group managed by the mobile apparatus can be acquired and disclosed by proxy. More specifically, when the mobile apparatus is connected to the central device of the upper piconet via the scatter network, an acquired service provided by a peripheral device of the lower piconet can be disclosed to the central device of the upper piconet. In this embodiment, the central device of the upper piconet is the in-vehicle information communication apparatus 103, and the peripheral devices of the lower piconet are the wearable camera 101 and the pulse rate meter 104. It is therefore possible to efficiently perform communication to use the service without needing a user operation of executing a pairing operation for each combination of devices that enjoy the service.

Note that in the above-described embodiment, formation of a plurality of piconets using a communication method complying with the Bluetooth standard has been described as an example. This embodiment can also be applied to formation of a plurality of networks including a master station (central device) and a slave station (peripheral device) using another short-range radio communication method in place of Bluetooth.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-125589, filed Jun. 27, 2017, which is hereby incorporated by reference herein in its entirety.

What is claimed is:

1. A communication apparatus comprising:
a first communication unit configured to receive, from a first sensing device functioning as a peripheral device complying with Bluetooth standard on a first piconet, information for identifying a sensing service supported by the first sensing device and data associated with the sensing service; and
a second communication unit configured to transmit, at every predetermined timing, an advertise packet complying with Bluetooth standard on a second piconet which includes the information for identifying the sensing service and the received data associated with the sensing service.

2. The apparatus according to claim 1, wherein the advertise packet includes information for identifying a service supported by the communication apparatus together with the information for identifying the sensing service.

3. The apparatus according to claim 1, wherein the first sensing device is a device having a function of sensing a predetermined target, and the data associated with the sensing service is measurement data sensed by the first sensing device.

4. The apparatus according to claim 1, further comprising a control unit configured to update data to be transmitted in the advertise packet to the data associated with the sensing service,
wherein the second communication unit transmits the advertise packet which includes the updated data.

5. The apparatus according to claim 1, wherein the information for identifying the sensing service includes a UUID (Universally Unique Identifier).

6. The apparatus according to claim 1, wherein the second communication unit transmits the information for identifying the sensing service and the data associated with the sensing service.

7. The apparatus according to claim 1, wherein the second communication unit transmits the information for identifying the sensing service to a second device at every predetermined timing independently of a reception of the request from the second device.

8. The apparatus according to claim 1, wherein upon receiving a request to search for a sensing service from a second device, the second communication unit transmits the information for identifying the sensing service.

9. The apparatus according to claim 8, wherein the data associated with the sensing service is included in a response received from the first sensing device in accordance with the transmission of the request to search for the sensing service to the first sensing device by the first communication unit.

10. The apparatus according to claim 1,
wherein the service supported by the first sensing device includes a health care service; and
wherein the received data associated with the sensing service includes health care information sensed by the first sensing device.

11. A method of controlling a communication apparatus, the method comprising:
receiving, from a first sensing device functioning as a peripheral device complying with Bluetooth standard on a first piconet, information for identifying a sensing service supported by the first sensing device and data associated with the sensing service; and
transmitting, at every predetermined timing, an advertise packet complying with Bluetooth standard on a second piconet which includes the information for identifying the sensing service and the received data associated with the sensing service.

12. A non-transitory computer-readable storage medium storing a program for causing a computer to execute a method of controlling a communication apparatus, the method comprising:
receiving, from a first sensing device functioning as a peripheral device complying with Bluetooth standard on a first piconet, information for identifying a sensing service supported by the first sensing device and data associated with the sensing service; and
transmitting, at every predetermined timing, an advertise packet complying with Bluetooth standard on a second piconet which includes the information for identifying the sensing service and the received data associated with the sensing service.

* * * * *